No. 650,115.  
G. W. PROUTY.  
INSULATING COUPLING FOR ELECTRIC WIRE CONDUITS.  
(Application filed Apr. 27, 1899.)  
(No Model.)
Patented May 22, 1900.
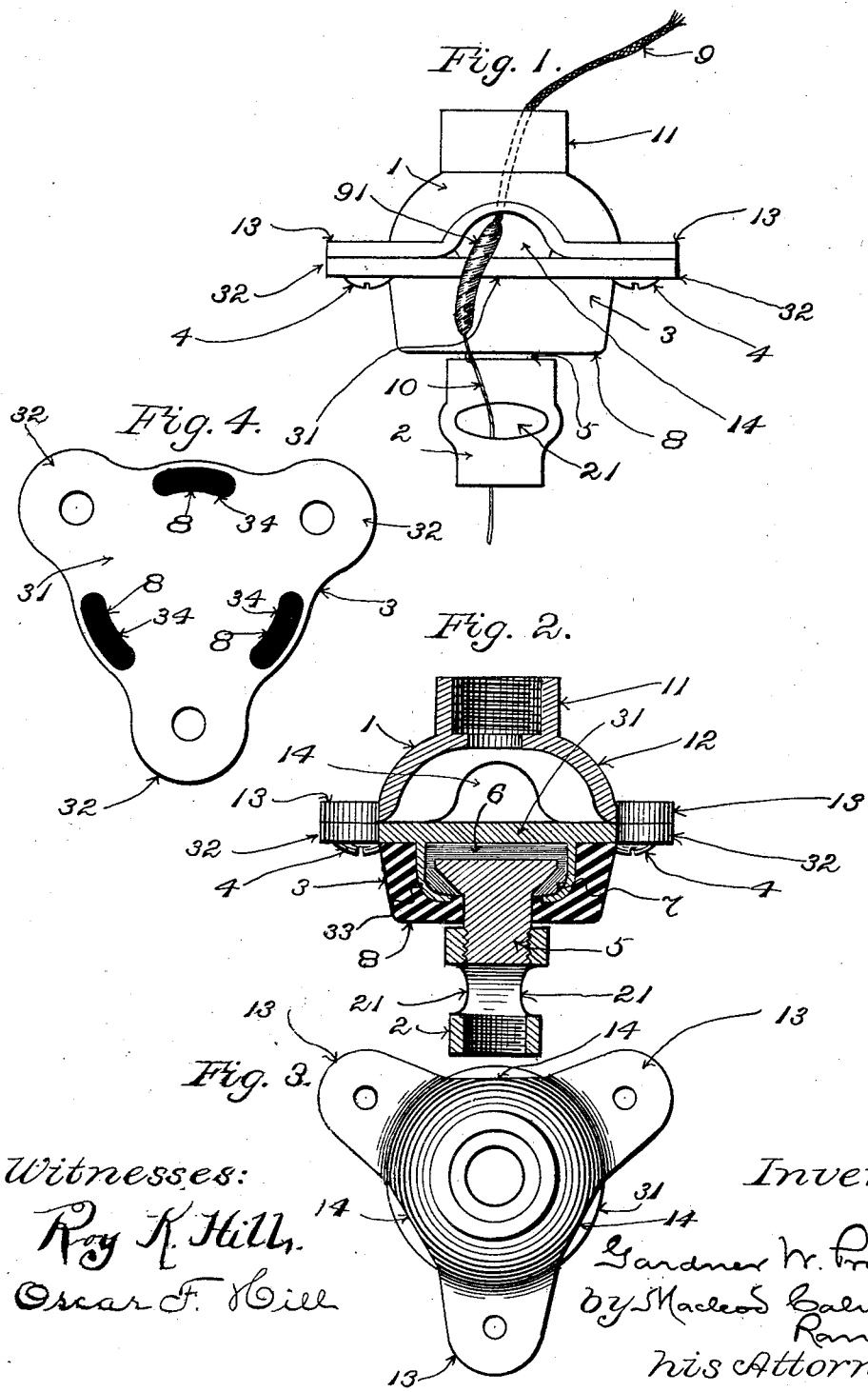

UNITED STATES PATENT OFFICE.

GARDNER W. PROUTY, OF LITTLETON, MASSACHUSETTS, ASSIGNOR TO THE W. T. C. MACALLEN COMPANY, OF BOSTON, MASSACHUSETTS.

INSULATING-COUPLING FOR ELECTRIC-WIRE CONDUITS.

SPECIFICATION forming part of Letters Patent No. 650,115, dated May 22, 1900.

Application filed April 27, 1899. Serial No. 714,663. (No model.)

*To all whom it may concern:*

Be it known that I, GARDNER W. PROUTY, a citizen of the United States, residing at Littleton, in the county of Middlesex and State of Massachusetts, have invented certain new and useful Improvements in Insulating-Couplings for Electric-Wire Conduits, of which the following is a specification, reference being had therein to the accompanying drawings.

In many cases the requirements of fire underwriters or the needs of practice compel large and heavy electric conducting-wires to be employed in the fixed conduits of buildings or the like—for instance, in connection with electric-lighting systems.

My invention has for its aims to provide an improved form of insulating-coupling designed to be interposed between an outlet of such a fixed conduit and an electric-light fixture or another section of conduit, and more especially to provide a coupling of practical and efficient construction which shall enable the ends of the heavy conducting-wires protruding from the outlet of a fixed conduit to be conveniently and quickly placed in proper position with relation to the coupling and joined to the wires from the electric-light fixture or other portion of conduit which is connected with the said coupling.

Figure 1 of the drawings shows in side elevation an insulating-coupling embodying the invention. Fig. 2 is a view of the same in central vertical section. Fig. 3 is a view of the same in plan. Fig. 4 is a plan of the intermediate portion of the coupling.

My improved coupling comprises, essentially, the connections 1 and 2 and the intermediate insulator 3. The connection 1 is designed for application to the outlet of a fixed conduit for electric conducting-wires, as aforesaid, while the connection 2 is designed to be connected with a light-fixture or another portion of conduit. The insulator 3 has provisions for enabling the connections 1 and 2 to be attached thereto on opposite sides thereof, and it serves to join or link the said connections together. The connection 1 is formed with the tubular interiorly-threaded portion 11 for application to the projecting threaded end or outlet of the fixed pipe or conduit. It is formed, also, with the hollow body 12, into the interior space of which leads the passage through the tubular portion 11. The lugs 13 13 project outward from the edge of the said body 12, and the lateral openings or notches 14 14 are formed in the said edge intermediate the said lugs. The insulator 3 is provided with a base-plate 31, having outwardly-projecting lugs 32 32, corresponding with those of the connection 1. By means of screws 4 4, fitted to holes in the two sets of lugs 13 13 and 32 32 the connection 1 and insulator 3 are secured together. On one face thereof the base-plate 31 is formed with a projecting flange 33, forming a cup, which receives the body of a connector 5, having a flanged or headed inner end, sheet-mica being interposed in layers at 6 between the flat back of the said flanged inner end or head and the adjacent portion of the base-plate and also at 7 between the flange or head of the connector and the free edge of the projecting flange 33 for the purpose of insulating the parts from each other. The free edge of projecting flange 33 is bent down upon the mica 7, thereby securing the connector 5 in place. A mass 8 of insulating composition is applied to the exterior of the said insulator 3, the said mass covering and inclosing the flange 33 and all but the outer end of the connector 5, and also covering one surface of the base-plate, with the exception of lugs 32 32. For the purpose of more effectually locking or anchoring the mass of composition in place holes are made through the base-plate 31, as at 34, Fig. 4, into which holes portions of the said composition are caused to enter at the time of molding the composition upon the metallic portions. The shape of the connection 2 and the manner of connecting the same with connector 5 may be varied to meet requirements in practice. Herein the said connection is shown tubular and internally threaded at its opposite ends to screw onto the externally-threaded projecting end of connector 5 and also to receive the end of a pipe forming part of an electric-light fixture or the like conduit for electric wires, it having lateral openings, as at 21 21, through which the wires from the fixture may be carried to the exterior of the coupling.

In the use of my improved coupling the connection 1 is screwed onto the projecting screw-threaded end or outlet of the fixed conduit after the ends of the wires have been thrust through the said connection, so as to project from the body side of the latter. The ends of the said wires next are separated and pressed outwardly in different directions, so as to cause them to occupy positions in notches 14 14 in the edge of the connection 1, after which the insulator 3 is secured in place by means of the screws 4 4, either before or after the same has been joined with a light-fixture or another portion of conduit by means of the connection 2. The lighter conducting-wires, which are employed in connection with the light-fixture or other conduit with which connection 2 is joined, are passed out through the lateral openings 21 21 in said connection. The free end of each of the heavy wires 9, Fig. 1, from within the fixed conduit is now bared of insulating material and joined with the bared end of one of the lighter wires 10 from the light-fixture, the joint being indicated at 91 in Fig. 1. Heavy conducting-wires, such as in some cases now are required to be used in the fixed conduits of buildings, cannot conveniently be threaded into tubular connections like that which herein is designated 2 and be passed in opposite directions out through lateral holes, as at 21 21. My improved construction of coupling, however, obviates all difficulty in this particular, since after drawing the ends of the heavy wires out through the central passage of connection 1 it is necessary, after separating the said ends, only to press them outwardly into notches 14 14 of said connection and then to apply the intermediate portion 3 and secure it in place by means of screws 4 4, which operations are quickly and easily effected.

In some cases I may replace the sheet-mica 6 7 by other suitable insulating material.

I claim as my invention—

1. The improved insulating-coupling comprising the connection 1 formed with the notches 14, 14, in the edge of its body, the insulator 3 consisting of the base-plate formed with flange 33, the connector 5 having its flanged or headed end inclosed and held by the said flange with insulating material interposed between the said connector and the base-plate and its flange, and the inclosing mass of insulating composition, means of detachably uniting the connection 1 with the said base-plate, and the connection 2, substantially as described.

2. The improved insulating-coupling comprising the connection 1 formed with the notches 14, 14, in the edge of its body, and with the outwardly-projecting lugs 13, 13, the insulator 3 consisting of the base-plate formed with corresponding lugs 32, 32, and with the flange 33, the connector 5 having its flanged or headed end inclosed and held by flange 33 with insulating material interposed between the said connector and the base-plate and its flange, and the inclosing mass of insulating composition, the screws passing through the two sets of lugs and uniting the connection 1 and insulator 3 to each other, and the connection 2, substantially as described.

In testimony whereof I affix my signature in presence of two witnesses.

GARDNER W. PROUTY.

Witnesses:
CHAS. F. RANDALL,
WILLIAM A. COPELAND.